United States Patent
Ueda et al.

(10) Patent No.: US 9,590,953 B2
(45) Date of Patent: Mar. 7, 2017

(54) INFORMATION PROCESSING DEVICE, INFORMATION PROCESSING METHOD, AND PROGRAM

(71) Applicants: Sony Corporation, Tokyo (JP); Sony Pictures Entertainment Inc., Culver City, CA (US)

(72) Inventors: Kenjiro Ueda, Kanagawa (JP); Tateo Oishi, Saitama (JP); Yoshikazu Takashima, Los Angeles, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 45 days.

(21) Appl. No.: 14/573,809

(22) Filed: Dec. 17, 2014

(65) Prior Publication Data

US 2016/0057112 A1 Feb. 25, 2016

Related U.S. Application Data

(60) Provisional application No. 62/040,448, filed on Aug. 22, 2014.

(51) Int. Cl.
*H04L 29/06* (2006.01)
*H04L 29/08* (2006.01)

(52) U.S. Cl.
CPC .......... *H04L 63/0428* (2013.01); *H04L 67/32* (2013.01)

(58) Field of Classification Search
CPC ...... H04L 63/0428; H04L 67/32; H04L 29/06
(Continued)

(56) References Cited

U.S. PATENT DOCUMENTS 8,542,593 B1 * 9/2013 Kumar .................. H04L 1/0078
370/235
2008/0049934 A1 2/2008 Onoda et al.
(Continued)

FOREIGN PATENT DOCUMENTS

JP 2005-51735 A 2/2005
JP 2006-236121 A 9/2006
(Continued)

OTHER PUBLICATIONS

International Search Report issued Aug. 4, 2015 in PCT/JP2015/069566 (with EnglishTranslation).
(Continued)

*Primary Examiner* — Evans Desrosiers
(74) *Attorney, Agent, or Firm* — Oblon, McClelland, Maier & Neustadt, L.L.P

(57) ABSTRACT

Provided is an information processing device including: a data processing unit that performs a content playback process; and a communication unit that communicates with a server, wherein the content is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit receives playback path information which is allowed to be played from the server through the communication unit, and selects variation data from the segment region so as to perform content playback, according to the playback path information received from the server.

17 Claims, 14 Drawing Sheets

(58) Field of Classification Search
USPC .............. 713/155–168, 189–193; 709/229; 380/8–30, 44–47, 277–286
See application file for complete search history.

(56) References Cited

U.S. PATENT DOCUMENTS

2009/0041237 A1* 2/2009 Takashima ....... G11B 20/00086
380/44
2012/0070128 A1 3/2012 Kato et al.

FOREIGN PATENT DOCUMENTS

| | | |
|---|---|---|
| JP | 2007-043336 | 2/2007 |
| JP | 2009-93721 A | 4/2009 |
| JP | 2012-65258 A | 3/2012 |
| WO | WO 2006/064738 A1 | 6/2006 |

OTHER PUBLICATIONS

PCT national stage document in Japanese submitted to JPO on Jan. 12, 2017—WIPO Application No. PCT/JP2015/069566.

* cited by examiner

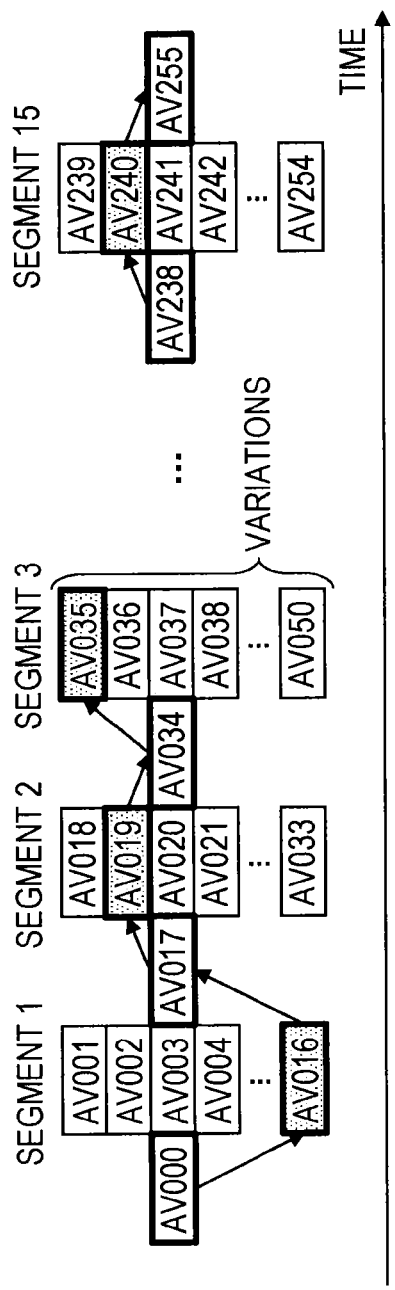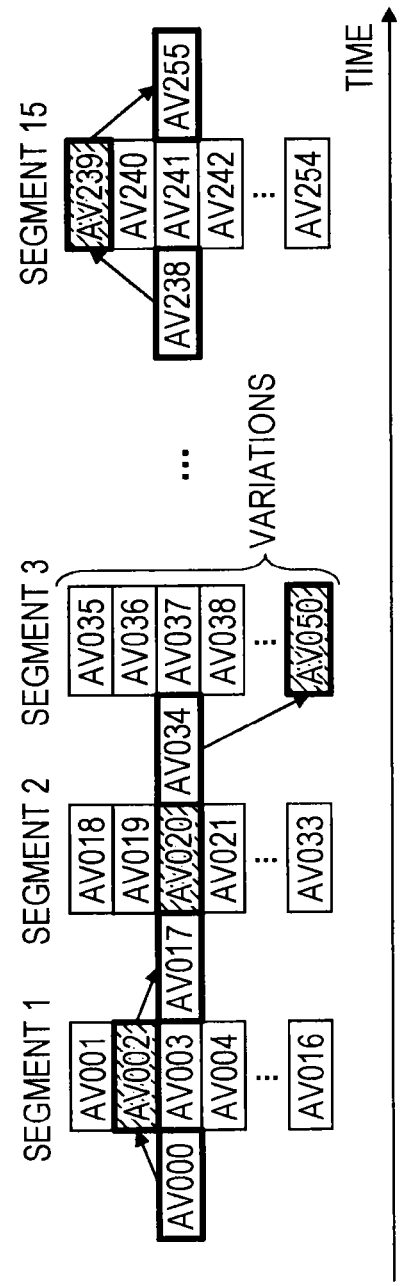

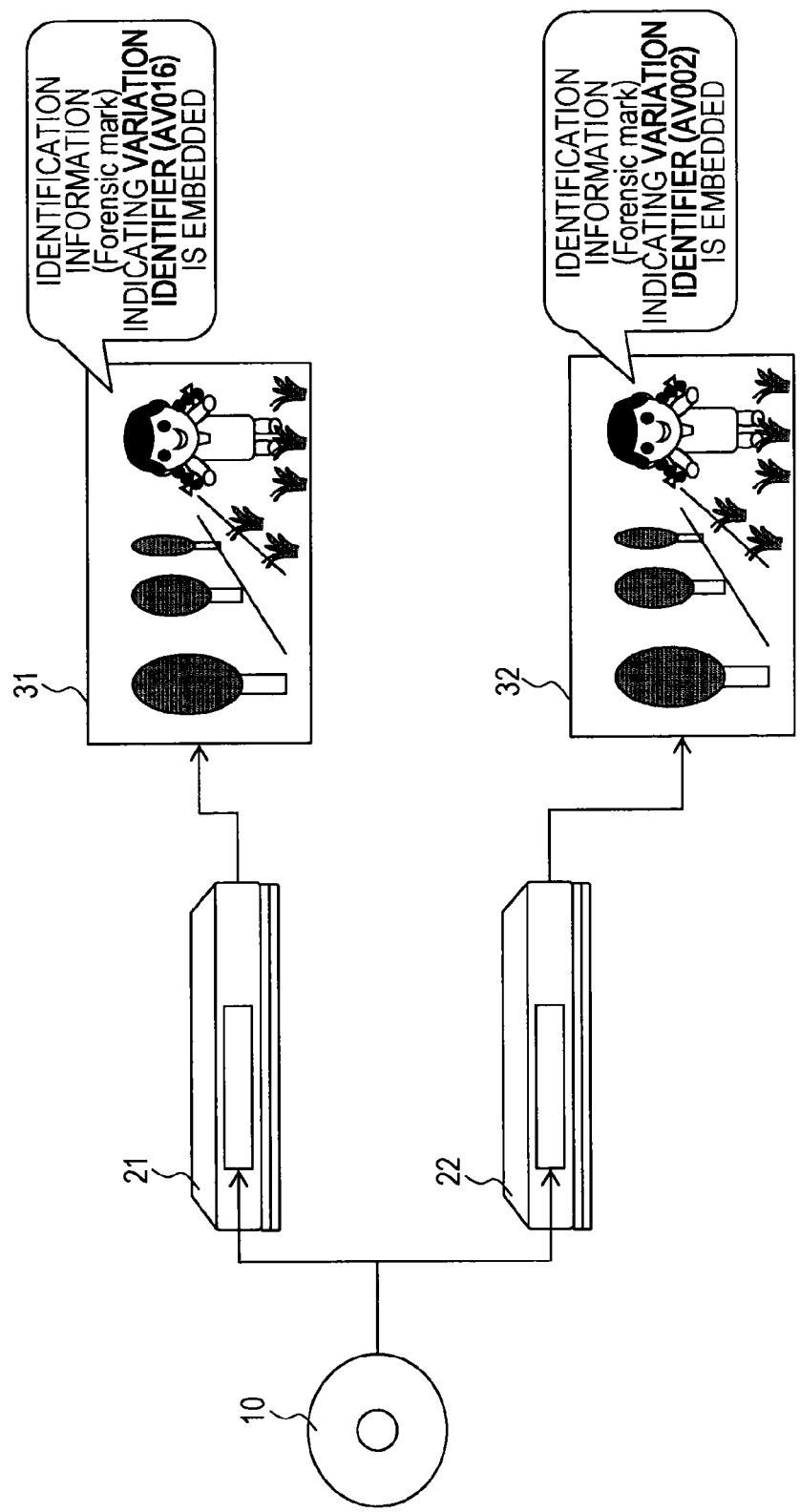

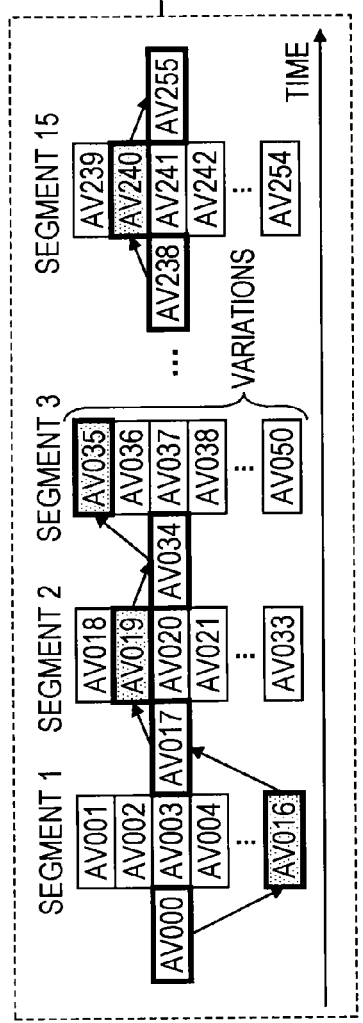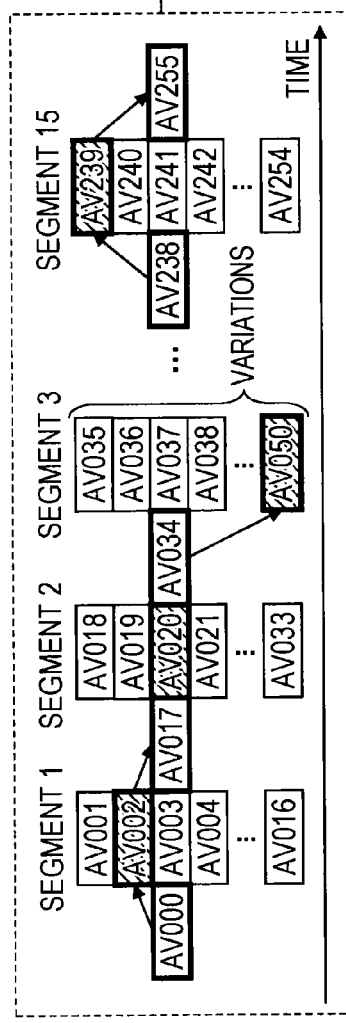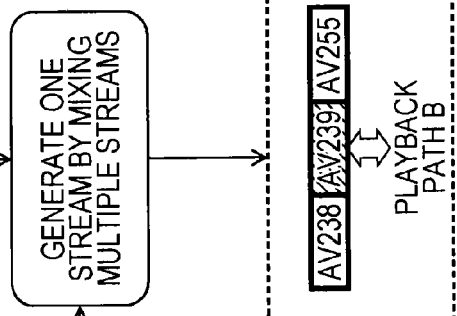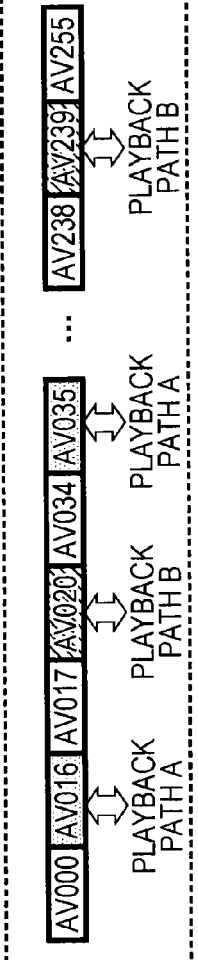

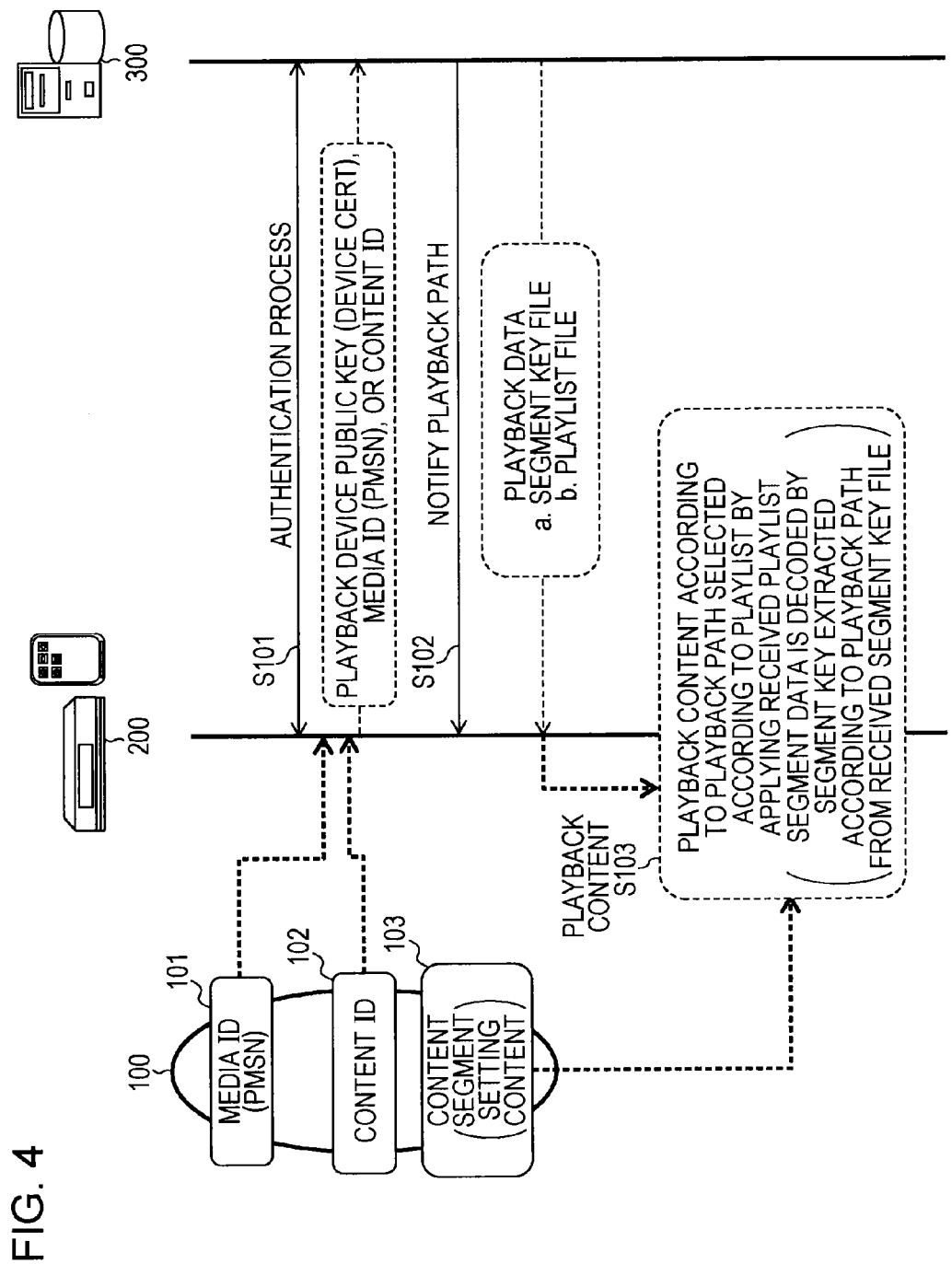

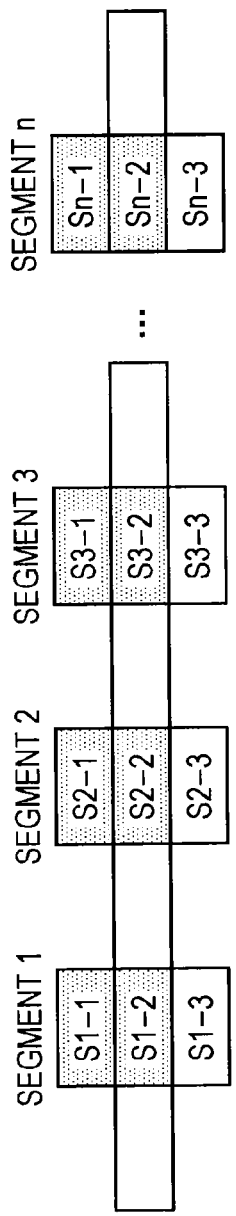

FIG. 10

| PLAYBACK DEVICE IDENTIFIER | RELIABILITY | NOTIFIED PLAYBACK PATH IDENTIFIER | VARIATION DATA INCLUDED IN PLAYBACK PATH | PLAYLIST IDENTIFIER TO BE APPLIED TO PLAYBACK |
|---|---|---|---|---|
| SN0001002 | HIGH | P0001 | S1-1, S2-1,... S1-16 | 0x001.mpls |
| PN0221002 | LOW | P0032 | S3-1, S4-2,... S3-16 | 0x051.mpls |
| .. | .. | .. | .. | |
| SN0221002 | LOW | P2055 | S8-1, S9-2,... S7-16 | 0x243.mpls |

FIG. 12

| | DATA THAT IS REGISTERED IN ASSOCIATION WITH VARIATION DATA WHICH IS REGISTERED AS MANAGEMENT DATA |
|---|---|
| (1) | PLAYBACK DEVICE MANUFACTURER IDENTIFIER |
| (2) | PLAYBACK DEVICE MODEL IDENTIFIER |
| (3) | PLAYBACK DEVICE-SPECIFIC IDENTIFIER |
| (4) | PLAYBACK PROGRAM IDENTIFIER |
| (5) | USER ID |
| (6) | DISK SERIAL NUMBER (PMSN) |

FIG. 13

| | REGION OF PLAYBACK DEVICE | PLAYBACK PATH | PLAYLIST |
|---|---|---|---|
| (1) | JAPAN | PLAYBACK PATH 000 TO 055 | PLAYLIST 000 TO 055 |
| (2) | NORTH AMERICA | PLAYBACK PATH 100 TO 145 | PLAYLIST 100 TO 145 |
| (3) | SOUTH AMERICA | PLAYBACK PATH 200 TO 222 | PLAYLIST 200 TO 222 |
| (4) | EUROPE | PLAYBACK PATH 300 TO 321 | PLAYLIST 300 TO 321 |
| (5) | CHINA | PLAYBACK PATH 400 TO 444 | PLAYLIST 400 TO 444 |
| (6) | SOUTHEAST ASIA | PLAYBACK PATH 500 TO 521 | PLAYLIST 500 TO 521 |
| .. | .. | .. | .. |

INFORMATION PROCESSING DEVICE, INFORMATION PROCESSING METHOD, AND PROGRAM

CROSS-REFERENCE TO RELATED APPLICATION

This application claims the benefit of priority of Provisional Application Ser. No. 62/040,448, filed Aug. 22, 2014, the entire contents of which is incorporated herein by reference.

BACKGROUND

The present disclosure relates to an information processing device, an information processing method, and a program. More specifically, the present disclosure relates to an information processing device, an information processing method, and a program, which enable source tracing of illegally distributed content and prevention of illegal use of content.

A digital versatile disc (DVD) or a Blu-ray (registered trademark) disc (BD) has been widely used as an information recording medium (media) that records various types of content such as movies and music.

Creators and distributors own copyrights and distribution rights for many types of content such as music data and image data which are recorded on the information recording medium. Accordingly, it is general to perform use control so as to allow only users with legitimate rights to use the content, when content stored on such an information recording medium (media) is provided to the users.

Specifically, for example, control is performed such that content is recorded as encrypted content, and the content can be decrypted by only an encryption key which has been provided to the users who has performed a legitimate content purchase process. However, even after such a process, for example, if the user who has encrypted content illegally distributes or publishes the decrypted content or the encryption key, unauthorized use of the content by many unspecified people occurs. Thus, in recent years, unauthorized publication or distribution of data is frequently performed through a network, and thus there is a major problem of preventing the unauthorized publication or distribution.

As a measure for preventing the unauthorized distribution of content, there is a configuration of enabling discrimination of a device that has performed a decryption process based on decrypted (plaintext) content.

It is configured to analyze decrypted content, for example, decrypted image data which is generated by decrypting encrypted content, and discriminate a device that has performed the decryption process, based on identification data extracted from an image.

A configuration enabling the source tracing is described in, for example, Japanese Unexamined Patent Application Publication No. 2007-43336.

In the configuration described in Japanese Unexamined Patent Application Publication No. 2007-43336, content is configured as a segment which is configuration data, for example, an image of a certain scene constituting movie content is configured as a plurality of pieces of variation data which can be decrypted by different keys. Each playback device selects and decrypts one piece of data which can be decrypted from a plurality of pieces of variation data by applying a playback device specific key which is stored in the playback device, and plays the image. The playback devices storing different keys decrypt different variation data for the image of the same scene and play the image. In this manner, different variation data is selected and played depending on each playback devices. In other words, a playback process is performed according to a different playback path depending on a playback device.

For example, when copy data of the decrypted content is distributed through a network, it is possible to identify a device that has decrypted the content, to some extent, by analyzing variation data and a playback path included in the content.

Further, encryption keys (decryption keys) stored in respective playback devices are different depending on manufacturers of devices, and it is possible to trace a source depending on the configuration units.

However, illegally copied content of which the source is not discriminated may be created by the following manner against the measure enabling the source tracing.

For example, one piece of content is generated by mixing two pieces of content configured with two different playback paths which are decrypted and played by two playback devices A and B.

For example, mixed content is configured in such a manner that the first part of the content is configured with a playback path corresponding to the playback device A which is decrypted by the playback device A and the second part of the content is configured with a playback path corresponding to the playback device B which is decrypted by the playback device B. When the mixed content is copied and spread on a network, it is difficult to trace a correct source from the copy content.

SUMMARY

It is desirable to provide an information processing device, and an information processing method, and a program, which enable more effective source tracing and can reduce distribution and use of illegally copied content.

According to an embodiment of the present disclosure, there is provided an information processing device including: a data processing unit that performs a content playback process; and a communication unit that communicates with a server, wherein the content is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit receives playback path information which is allowed to be played from the server through the communication unit, and selects variation data from the segment region so as to perform content playback, according to the playback path information received from the server.

According to an another embodiment of the present disclosure, there is provided an information processing device including: a communication unit that communicates with a playback device that performs content playback; and a data processing unit that performs a generation process or an acquisition process of transmission data for the playback device, wherein content played by the playback device is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit, notifies the playback device of playback path information which is allowed to be played, through the communication unit, and generates management data in which the notified playback path information and identification information of the playback device which is a notification destination are associated with each other.

According to a still another embodiment of the present disclosure, there is provided an information processing method performed by an information processing device, wherein the information processing device includes a data processing unit that performs a content playback process; and a communication unit that communicates with a server, wherein the content is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit receives playback path information which is allowed to be played from the server through the communication unit, and selects variation data from the segment region so as to perform content playback, according to the playback path information received from the server.

According to a still another embodiment of the present disclosure, there is provided an information processing method performed by an information processing device, wherein the information processing device includes a communication unit that communicates with a playback device that performs content playback; and a data processing unit that performs a generation process or an acquisition process of transmission data for the playback device, wherein content played by the playback device is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit, notifies the playback device of playback path information which is allowed to be played, through the communication unit, and generates management data in which the notified playback path information and identification information of the playback device which is a notification destination are associated with each other.

According to a still another embodiment of the present disclosure, there is provided a program for causing an information processing device to perform information process, wherein the information processing device includes a data processing unit that performs a content playback process; and a communication unit that communicates with a server, wherein the content is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the program causes the data processing unit to performs a process of receiving playback path information which is allowed to be played from the server through the communication unit, and a process of selecting variation data from the segment region so as to perform content playback, according to the playback path information received from the server.

According to a still another embodiment of the present disclosure, there is provided a program for causing an information processing device to perform information process, wherein the information processing device includes a communication unit that communicates with a playback device that performs content playback; and a data processing unit that performs a generation process or an acquisition process of transmission data for the playback device, wherein content played by the playback device is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the program causes the data processing unit to performs a process of notifying the playback device of playback path information which is allowed to be played, through the communication unit, and a process of generating management data in which the notified playback path information and identification information of the playback device which is a notification destination are associated with each other.

Further, for example, the program of the present disclosure is a program that can be provided by a recording medium and a communication medium which is provided in a computer-readable format to an information processing device or a computer system capable of executing various programs and codes. The process according to the program is realized in the information processing device or the computer system, by providing the program in a computer-readable format.

Other features and advantages of the present disclosure will become apparent from the further detailed description based on embodiments of the present disclosure to be described later and attached drawings. Further, the system in the specification is a logical set of a plurality of devices, and is not necessary that the devices of respective configurations are within the same housing.

According to the configuration of an embodiment of the present disclosure, a configuration of performing reliable source analysis of the illegally copied content by using content for which a playback path can be configured is realized.

Specifically, content is used which has a segment region configured with a plurality of pieces of variation data which can be respectively decrypted by different keys, and for which a playback path can be configured according to selected variation data. In each piece of variation data, a variation data identifier can be analyzed from the decrypted data. The playback device selects variation data according to the playback path information received from the server, and plays content. The server generates management data in which the playback path information notified to the playback device and the playback device identification information are associated with each other, and performs the source tracing of illegal copy, based on the variation data included in the illegally copied content.

According to the present configuration, a configuration of performing reliable source analysis of illegally copied content by using content for which a playback path can be configured is realized.

Source tracing is possible in a unit of one piece of variation data constituting each playback path, and thus even when mixed content in which a plurality of pieces of decrypted content are mixed is distributed, it is possible to analyze all sources of each piece of content, which have generated the mixed content.

Note that the effects described herein are illustrative only and not limited thereto, and there may be an additional effect.

BRIEF DESCRIPTION OF THE DRAWINGS

FIGS. 1A and 1B are diagrams describing a configuration example of content for which a playback path corresponding to a playback device can be configured;

FIG. 2 is a diagram describing an example of detecting identification information from configuration data of content for which a playback path corresponding to a playback device can be configured;

FIGS. 3A to 3C are diagrams describing an example of mixed content generated by using content for which a playback path corresponding to a playback device can be configured;

FIG. 4 is a sequence diagram describing a communication sequence between a playback device and a server according to the process of an embodiment of the present disclosure;

FIGS. 6A and 6B are diagrams describing a playback path configuration example for the playback device according to the process of an embodiment of the present disclosure;

FIG. 10 is a diagram describing an example of management data generated by a server;

FIG. 12 is a diagram describing an example of embedded data for variation data of a segment region;

FIG. 13 is a diagram describing a configuration example of a playback path; and

DETAILED DESCRIPTION OF EMBODIMENTS

Figure 5:
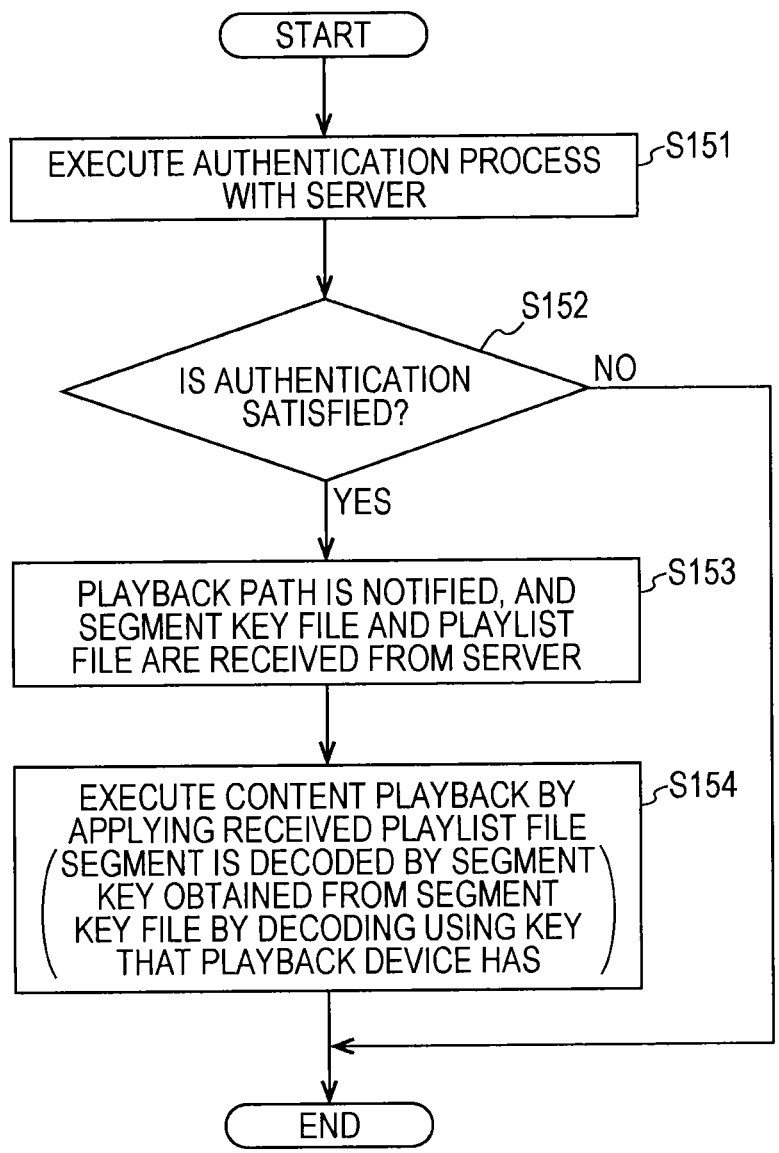
FIG. 5 is a diagram illustrating a flowchart describing a processing sequence of a playback device according to the process of an embodiment of the present disclosure.

Hereinafter, a detailed description will be given of an information processing device, an information processing method, and a program of the present disclosure with reference to the drawings. Further, the description will be performed according to the following items.

1. For overview of source tracing process based on playback path analysis
2. For configuration of realizing reliable source analysis from illegally distributed content
3. For configuration example of playback path for specifying server
4. For source tracing process of illegally distributed content 5. For hardware configuration example of information processing device
6. Summary of configuration of present disclosure

[1. For Overview of Source Tracing Process Based on Playback Path Analysis]

Before the description of the configuration of the present disclosure, first, an overview of an existing source tracing process based on a playback path analysis will be described.

FIGS. 1A and 1B are diagrams describing a configuration example of a playback path of content depending on a playback device.

FIGS. 1A and 1B show the following respective drawings.

FIG. 1A: A playback path A of a playback device A

FIG. 1B: A playback path B of a playback device B

AV000, AV001, AV002 . . . illustrated in FIGS. 1A and 1B are, for example, image data of scenes constituting certain movie content, for example, image data constituting content formed of image frames of a few seconds.

A plurality of pieces of image data corresponding to scenes which are sequentially played are illustrated along a time axis (time) which is indicated from the left to the right of FIGS. 1A and 1B.

For example, a first scene is AV000.

16 pieces of image data of AV001 to AV0016 are configured, as data subsequent to the first scene AV000.

The 16 pieces of image data of AV001 to AV0016 represent the same scene, but have been encrypted by respective different keys (segment keys).

Each playback device can play image data by selecting one piece of data available on a key stored in its own device.

An image data region in which one piece of data from a plurality of pieces of data can be selected and played in this manner is referred to as a segment or a segment region.

Other than the segment region, a section in which only one piece of data is prepared is referred to as a single data region. For example, only one piece of data is set in the playback sections such as AV000 and AV017, and all playback devices play only the one piece of data. Such a section is referred to as a single data region.

In the example illustrated in FIGS. 1A and 1B, 16 segment regions (segments 1 to 16) are set in content.

Further, data which has been encrypted by 16 different keys (=data that can be decrypted) is configured in each of the segments 1 to 16. Each of a plurality of pieces of data that can be decrypted by different keys configured in the segment regions is referred to as variation data.

Further, a key for decryption of variation data is referred to as a segment key. The segment keys are respectively set to different keys depending on respective pieces of variation data.

The example shown in FIG. 1A shows a playback path of a playback device A.

The playback device A sequentially plays the following respective pieces of data.

AV000→>[AV016]→AV017→[AV019]→AV034→[AV036] . . . →AV238→[AV240]→AV255

The above path is the playback path A of the playback device A.

Further, data surrounded by [ ], such as [AVxxx], among the playback data is variation data which is configured in each segment region.

The playback device A selects data that can be decrypted by the playback device A, from 16 pieces of variation data (encryption data) which are configured in the segment region, and plays the selected data.

The data which is not surrounded by [ ] is data in regions other than the segment region and is data to be commonly played by all playback devices.

Meanwhile, the playback device B shown in FIG. 1B sequentially plays the following respective pieces of data.

AV000→[AV002]→AV017→[AV020]→AV034→[AV050] . . . →AV238→[AV239]→AV255

The above path is the playback path B of the playback device B.

Data surrounded by [ ], such as [AVxxx], among the playback data is variation data, and the playback device B selects data that can be decrypted by the playback device B, from 16 pieces of variation data (encryption data) which are set in the segment region, and plays the selected data.

The data which is not surrounded by [ ] is data in regions other than the segment region and is data to be commonly played by all playback devices.

If the playback path A of the playback device A is compared to the playback path B of the playback device B, respective pieces of playback data in the single data regions other than the segment regions are common. However, respective pieces of variation data to be played on the segment regions are different pieces of data.

An identifier indicating a type of variation data, that is, a variation data identifier such as [AVxxx] is embedded in the variation data which is configured in the segment region in each playback path.

In other words, it is possible to determine a type of variation data played by analyzing the playback image data.

The playback image data by each playback device and an image analysis process for the playback image data will be described with reference to FIG. 2.

Content configured with the segment region and the single data region, which are described with reference to FIGS. 1A and 1B, is stored in the information recording medium (disc) 10 shown in FIG. 2.

The playback device A21 plays the content along the playback path A described with reference to FIG. 1A.

The playback device B21 plays the content along the playback path B described with reference to FIG. 1B.

The playback image A, 31 is variation data selected from one segment region and variation data [AV016] included in the playback path A.

The playback image B, 32 is different variation data selected from one segment region and variation data [AV002] included in the playback path B.

The two playback images A and B are, for example, data of the same scene of movie content, and images that are appreciated by an audience without distinction.

However, the playback image A, 31 is the variation data [AV016] included in the playback path A, and identification information (variation data identifier) indicating the variation data [AV016] is embedded in the playback image A, 31. For example, the identification information is embedded by a technology such as a watermark.

Further, the identification information embedded in such playback data is referred to as a Forensic Mark or a Forensic watermark.

The playback image B, 32 is the variation data [AV002] included in the playback path B, and identification information (variation data identifier) indicating the variation data [AV002] is embedded in the playback image B, 32.

15 segment regions are configured in the content shown in FIGS. 1A and 1B.

For example, when copy content which is illegally distributed is found on a network, if determining a type of variation data the playback images in 15 segment regions included in the illegally distributed content, the playback path of the content becomes apparent.

For example, if the copy content which is illegally distributed is the content configured with the playback path A shown in FIG. 1A, with respect to the copy content, it is possible to determine that the content decrypted by the playback device A illustrated in FIG. 2 is original data, and the playback device A is the source of the illegally copied content.

Further, for example, if the copy content which is illegally distributed is the content configured with the playback path B shown in FIG. 1B, with respect to the copy content, it is possible to determine that the content decrypted by the playback device B illustrated in FIG. 2 is original data, and the playback device B is the source of the illegally copied content.

However, there is a problem in that the source determination is difficult when one content is generated by mixing a plurality of pieces of decrypted content, as weakness of the source determination process based on the playback path analysis.

The problem will be described with reference to FIGS. 3A to 3C.

FIG. 3A shows a playback path A to be played by the playback device A, as described above with reference to FIG. 1A.

FIG. 3B shows a playback path B to be played by the playback device B, as described above with reference to FIG. 1B.

It is possible to generate one piece of decrypted content by mixing the decrypted content to be played along two playback paths.

For example, the generated decrypted content is the mixed content shown in FIG. 3C. The playback path of the mixed content is configured as follows:

AV000→[AV016]→AV017        [AV020]→AV034→[AV035] . . . →AV238→[AV239]→AV255

The playback path is the playback path of the mixed content shown in FIG. 30.

Data surrounded by [ ] such as [AVxxx] among the playback data is variation data.

In the mixed content (FIG. 3), as the variation data, variation data: [AV016] and [AV035] constituting the playback path A and variation data: [AV020] and [AV239] constituting the playback path B are mixed.

If the mixed content (FIG. 3) is illegally copied and distributed, it is difficult to determine the source based on the playback path of the mixed content. When a playback device X which plays the playback path X matching to the mixed content by chance is present, there is a possibility in that the playback device X is erroneously determined as the source of the illegally copied content.

In this manner, in the configuration using the playback path which is configured depending on a playback device, if mixed content in which a plurality of pieces of decrypted content are mixed is generated, there is a problem in that correct source tracing becomes difficult.

[2. For Configuration of Realizing Reliable Source Analysis from Illegally Distributed Content]

Next, a configuration of realizing a reliable source analysis from illegally distributed content will be described.

FIG. 4 is a sequence diagram illustrating a process example of the present disclosure.

In FIG. 4, an information recording medium 100 storing content 103 to be played, a playback device 200 that plays content from the information recording medium 100 mounted thereon, and a server 300 that communicates with the playback device 200 are illustrated from the left.

Further, examples of the playback device 200 include disc playback dedicated devices (CE devices) such as disc players, and various types of playback devices such as smart phones or tablet terminals.

Further, FIG. 4 illustrates an example in which the information recording medium 100 is a disc type information recording medium, but the information recording medium 100 may be, for example, a flash memory such as an SD card as well as the disc.

The content 103 to be played which is stored in the information recording medium 100 is content including a segment region configured with a plurality of pieces of variation data that can be decrypted by different keys (segment keys).

A content ID 102 which is another content identifier of content 103 is recorded on the information recording medium 100.

Further, a media ID 101 which is identification information of the information recording medium is recorded. The media ID is, for example, a prerecorded media serial number (PMSN) or the like which is recorded on a disc in a rewriting difficult manner by a physical recording process.

The information recording medium 100 is mounted on the playback device 200, and the playback device 200 plays content 103.

For the playback process, a description key (segment key) of variation data which is configuration data of the content 103 is necessary.

In the present embodiment, the segment key is not recorded on the information recording medium 100, and is provided from the server 300.

With reference to the sequence diagram shown in FIG. 4, a description will be give of a sequence from when the playback device 200 acquires the segment key from the server until the playback device 200 plays the content 103 stored in the information recording medium 100.

(Step S101)

First, the playback device 200 on which the information recording medium 100 is mounted performs an authentication process with the server 300 in step S101.

For example, a mutual authentication process according to a public key encryption scheme is performed.

The playback device 200 transmits a public key certificate (Device Cert) that is stored in the memory of its own device to the server 300.

The server 300 also provides the playback device 200 with the public key certificate of the server (Server Cert).

The mutual authentication process for confirming the validity of both devices is performed, by a process involving exchanging of the public key certificates.

Further, at the time of the mutual authentication process or after the mutual authentication process is established, the playback device 200 transmits the media ID 101 or the content ID 102, which is read from the mounted information recording medium 100, to the server 300.

The media ID 101 or the content ID 102 is used as data for identifying the content 103 stored in the information recording medium 100.

The server 300 identifies the content to be played, based on the media ID 101 or the content ID 102, and provides the playback device 200 with a segment key file and a playlist file to be applied to the playback.

If the mutual authentication process is established in step S101 and the validity of both devices is confirmed, the process proceeds to step S102.

Further, if the mutual authentication process is not established, the process of step S102 is not performed. In other words, the playback device 200 does not receive the segment key file and the playlist file from the server and does not play the content.

(Step S102)

If the mutual authentication process of step S101 is established and the validity of both devices is confirmed, the process proceeds to step S102.

In step S102, the server 300 notifies the playback device 200 of the playback path. Here, the playback path is the playback path which is described above with reference to FIGS. 1A, 1B and 3.

An identifier of an individual playback path, for example, a playback path number is set in the playback path, and the server 300 notifies the playback device 200 of the playback path number.

Further, along with the notification of the playback path, the server 300 notifies the playback device 200 of two files for the playback device 200 of a. segment key file b. playlist file.

a. segment key file is a file storing a segment key necessary for decrypting variation data which is configured in the segment region of the content 103.

Further, the segment key stored in the segment key file is in an encrypted state, and it is configured to be able to acquire a segment key by decrypting the encrypted segment key by the key stored in the playback device 200.

The segment key file transmitted from the server 300 to the playback device 200 is a file configured with only the segment key necessary for decrypting the variation data that is played according to the playback path notified to the playback device 200.

Alternatively, it may be configured to include all segment keys to be applied to the description of all pieces of variation data which are in all segment regions configuring the content as encryption data. However, in the case of this configuration, a segment key file having a configuration in which only segment keys necessary for decrypting the variation data to be played on the playback path notified to the playback device 200 can be decrypted by the key owned by the playback device is generated and transmitted.

b. playlist file is playback control information for the server 300 to play the content according to the playback path notified to playback device 200.

One play list is associated with one playback path.

In other words, in order to play the content of different playback paths, it is necessary to use different playlists.

In the illustrated example, one playback path is notified from the server 300 to the playback device 200 in step S102, and the playlist for playing the content according to the notified playback path is provided from the server 300 to the playback device 200.

Further, a configuration is preferable in which the data provided from the server 300 to the playback device 200 be and provided while being encrypted by a public key which is obtained from, for example, the public key certificate (Device Cert) of the playback device.

Further, a description has been given assuming that the playlist file is provided from the server to the playback device in this sequence, but it may be configured to use the playlist that is recorded in advance on the information recording medium 100. In this case, transmission of the playlist file from the server may be omitted.

(Step S103)

The playback device 200 receives notification for the playback path from the server 300, and each piece of data of a segment key file storing a segment key to be applied to the decrypting of the variation data configured in the notified playback path and a playlist file which is playback control information for playing the content according to the notified playback path performs a process of decrypting and playing the content 103 stored in the information recording medium 100 by using the received data.

The content 103 stored in the information recording medium 100 has, for example, the following hierarchy structure.

(a) title (b) movie object (playback control program)

(c) playlist (d) clip (a) title is a content title for identifying playback content.

(b) movie object (playback control program) is a playback control program of content.

When content is played by using a general Blu-ray (registered trademark), it is configured in such a manner that the movie object selects one (c) playlist corresponding to the playback path, according to the title for specifying the content to be played.

However, in the process of the present disclosure, the playlist received from the server 300 may be used.

(d) clip is configured with clip AV stream files storing content to be played and a clip information file which is the playback control information associated with each of the clip AV stream files.

The content is played by specifying the clip information file according to the playlist file and selecting the clip AV stream file storing content to be played according to the clip information file.

Further, the content described with reference to FIGS. 1A and 1B is configured with data stored in the clip AV stream file. In other words, content having a segment region configured with a plurality of pieces of variation data and a single data region configured with one piece of common playback data is configured with data stored in the clip AV stream file.

A plurality of pieces of variation data that can be decrypted by respective different keys are configured in the segment region.

The playback device 200 decrypts one piece of variation data selected from each segment region so as to play content, by using the segment key obtained by applying and decrypting a key stored in the memory of its own device, from the segment key file received from the server 300.

Further, through the playback process to which the playlist received from the server 300 is applied, one playback path is automatically selected, and one piece of variation data is sequentially selected from each segment region. The playback device 200 decrypts the selected variation data by the segment key corresponding to the variation data obtained from the segment key file so as to play content.

Further, variation data identification information (Forensic Mark) indicating a type of variation data is embedded in the variation data of an image or the like obtained by the decryption process.

The sequence of the process performed by the playback device 200 will be described with reference to the flowchart illustrated in FIG. 5.

The process according to the flow illustrated in FIG. 5 is performed in the, for example, data processing unit included in the CPU having a program execution function of the playback device 200, according to the program stored in the storage unit of the playback device 200.

(Step S151)

The playback device 200 on which the information recording medium 100 is mounted first performs an authentication process with the server 300 in step S151.

As described above, for example, the playback device 200 performs mutual authentication according to a public key encryption method.

(Step S152)

It is determined whether or not authentication is established in step S152, when authentication is not established, the process is ended. In this case, the content is not played.

Meanwhile, when it is determined that authentication is established, the process proceeds to step S153.

(Step S153)

If the mutual authentication process in step S151 is established and the validity of both devices is confirmed, the playback device 200 receives the following data from the server 300, in step S153. In other words, playback path information segment key file playlist file the above data is received from the server 300.

Further, the playback path information may be configured to be included in the playlist file.

The playback path information is playback path information corresponding to a playback segment string of the content 103 played by the playback device 200.

The segment key file is a file storing a segment key necessary for decrypting the data in the segment region of the content 103.

The playlist file is the playback control information for playing the content according to the playback path notified to the playback device 200 from the server 300.

One playlist is associated with one playback path.

Further, as described above, the playlist file may be configured to use the playlist recorded in advance on the information recording medium. In this case, a process of receiving the playlist file from the server may be omitted.

(Step S154)

The playback device 200 which has been received notification for the playback path, the segment key file, and the playlist file corresponding to the notified playback path from the server 300 decrypts the content 103 stored in the information recording medium 100 by the received files, and performs a playback process in step S154.

Content playback according to the playback path notified from the server 300 is performed, according to the playlist file received from the server 300.

A plurality of pieces of variation data that can be decrypted by respective different keys are configured in the segment region included in the playback path.

The playback device 200 decrypts one piece of variation data selected from each segment region so as to play the content, by using a segment key obtained by applying and decrypting a key stored in the memory of its own device, from the segment key file received from the server 300.

Further, one playback path is automatically selected from the play list received from the server 300, and one piece of variation data is sequentially selected from each segment region, such that the playback device 200 decrypts the selected variation data by the segment key obtained from the segment key file so as to play the content.

Further, the identification information (Forensic Mark) indicating a type of variation data is embedded in the variation data obtained by the decrypting process.

Further, as described above, the playlist file for performing playback according to the playback path may be configured to be recorded in advance on the information recording medium 100 storing the content 103. In other words, a plurality of playlist files for playing the content corresponding to a plurality of playback paths are recorded in advance on the information recording medium 100. The playback device 200 selects a playlist file from the information recording medium 100 according to the playback path information received from the server 300 and uses the selected playlist file.

In this manner, when the playlist file is recorded on the information recording medium 100 and content is played by using the playlist file, the playback path information is received from the server 300, the playlist file for playing content according to the received playback path is selected from the information recording medium 100 and a playback process is performed.

In this case, the playback path information notified to the playback device 200 from the server 300 is assumed to include playlist file specifying information for specifying one playlist file applicable to the playback of the playback path.

The playback device 200 selects one playlist from a plurality of playlists recorded on the information recording medium 100, according to playback path specifying information including the playlist file specifying information received from the server 300, and plays content according to the selected playlist.

[3. For Configuration Example of Playback Path for Specifying Server]

As described with reference to FIGS. 4 and 5, in the process of the present disclosure, the server 300 determines a playback path of the playback device 200 and notifies the playback device 200 of the playback path.

The playback device 200 performs a content playback process according to the playback path that is notified from the server 300.

A configuration example of the playback path specified by the server 300 and an effect of a playback path specification control by the server will be described with reference FIGS. 6A and 6B and the subsequent drawings.

The server 300 notifies the playback device 200 of the playback path in response to the access from the playback device 200, and thus there is an advantage that the server 300 confirms, for example, the type or the like of the playback device 200 and determines the playback path, depending on the confirmed type or the like of the playback device.

The example of the playback device 200 includes disc playback dedicated devices such BD players which are so-called consumer electronic (CE) devices, smart phones, tablet terminals, and the like.

The user frequently downloads various application programs for use, by using the smart phones and the tablet terminals among the various devices.

The downloadable programs include many illegal programs, and thus a content copy process is likely to be performed by using the illegal programs.

Meanwhile, the CE devices such as the BD players are not likely to perform a process of downloading applications for use, and are not likely to perform the content copy process by using the illegal programs.

The server 300 divides the playback device 200 into the following two groups, based on, for example, the above criteria for determination:

(a group having a high reliability) playback devices having a high reliability which is unlikely to be a source of illegal copy, and (a group having a low reliability) playback devices having a low reliability which is likely to be a source of illegal copy.

The server 300 determines the type of the playback device 200, at the stage of the authentication process of the processing sequence of FIG. 4. For example, it is possible to determine the type of the playback device, based on the public key certificate (Device Cert) that is received from the playback device 200.

Through the device type determination process, the playback device 200 determines which group of the groups 1 and 2 the device belongs to.

The server 300 performs the following playback path notification process, depending on the determination result.

The playback device of the group having a high reliability is notified a playback path corresponding to the group having a high reliability which is defined in advance.

Meanwhile, the playback device of the group having a low reliability is notified a playback path corresponding to the group having a low reliability which is defined in advance.

For example, the playback device of the group which is determined to have a low reliability is notified of the playback path including specific variation data which is selected in advance.

Further, the playback path corresponding to the group having a high reliability and the playback path corresponding to the group having a low reliability are different.

Specific configuration example of a playback path will be described with reference to FIGS. 6A and 6B.

FIG. 6A is a diagram illustrating a configuration example of content stored in the information recording medium. The content has a plurality of segment regions, and three pieces of variation data that can be decrypted with three different segment keys are configured in each segment.

Each piece of variation data is data from which a variation data identifier can be detected from the decrypted result.

Three pieces of variation data (Sk-1, Sk-2, and Sk-3) are configured in each segment. k represents segment numbers of 1 to n.

Among the three segments, the playback device having a high possibility of being the source of illegal copy (=the playback device having a low reliability) is notified of the playback path configured with the variation data (Sk-1) or (Sk-2).

Meanwhile, the playback device having a low possibility of being the source of illegal copy (=the playback device having a high reliability) is notified of the playback path configured with the variation data (Sk-3).

FIG. 6B illustrates a specific playback path configuration example.

The playback device A is a CE device, in other words, a disc playback dedicated device such as a BD player, and is the playback device of "the group having a high reliability" with a low possibility of being the source of illegal copy.

The server notifies the playback device A of the group having a high reliability of the playback path in which the playback data is set to the variation data (Sk-3).

When providing a playlist, a playlist is provided which is applied to play the playback path in which the playback data is set to the variation data (Sk-3).

The playback device B is a smart phone, and is the playback device of "the group having a low reliability" with a high possibility of being the source of illegal copy.

The server notifies the playback device B of the group having a low reliability of the playback path in which the playback data is set to the variation data (Sk-1).

When providing a playlist, a playlist which is applied to play the playback path in which the playback data is set to the variation data (Sk-1) is provided.

The playback device C is a tablet terminal, and is a device of "the group having low reliability" having a high possibility of being the source of illegal copy.

The server notifies the playback device C of the group having low reliability of a playback path in which playback data is set to variation data (Sk-2).

When providing a playlist, a playlist which is applied to play the playback path in which the playback data is set to the variation data (Sk-2) is provided.

In this manner, according to the sequence described with reference to FIG. 4, a process for notifying a playback device of a playback path is performed in response to the request from the playback device 200, and thus the server 300 can freely configure a playback path, for example, depending on the type of the playback device 200.

As a result, even when mixed content is generated by mixing a plurality of pieces of content decrypted in a plurality of playback devices and copies of the mixed content are illegally distributed, it is possible to reliably identify the source of the illegally copied content.

The example of the source identifying process will be described with reference to FIGS. 7A and 7B.

Figure 7A:
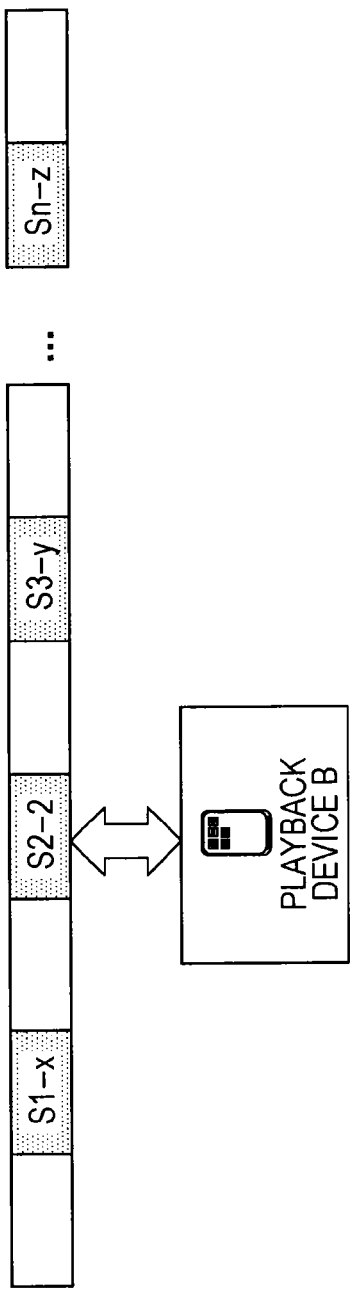
FIGS. 7A and 7B are diagrams describing an example of source tracing process of illegally distributed content according to the process of an embodiment of the present disclosure.

For example, the content shown in FIG. 7A is assumed to be illegally copied content that is distributed through a network. The illegally copied content is assumed to be mixed content that is generated by mixing a plurality of pieces of content decrypted in a plurality of playback devices.

For example, the server 300 that performs content management extracts variation data included in the copy content, and analyzes the variation data identifier included in the variation data.

For example, from the content illustrated in FIG. 7A, a variation data identifier (S2-2) is extracted from the variation data S2-2.

The variation data S2-2 is variation data included in the playback path notified to the playback device B, and the server 300 can determine that at least one of the sources of the copy content is the playback device B.

Figure 7B:
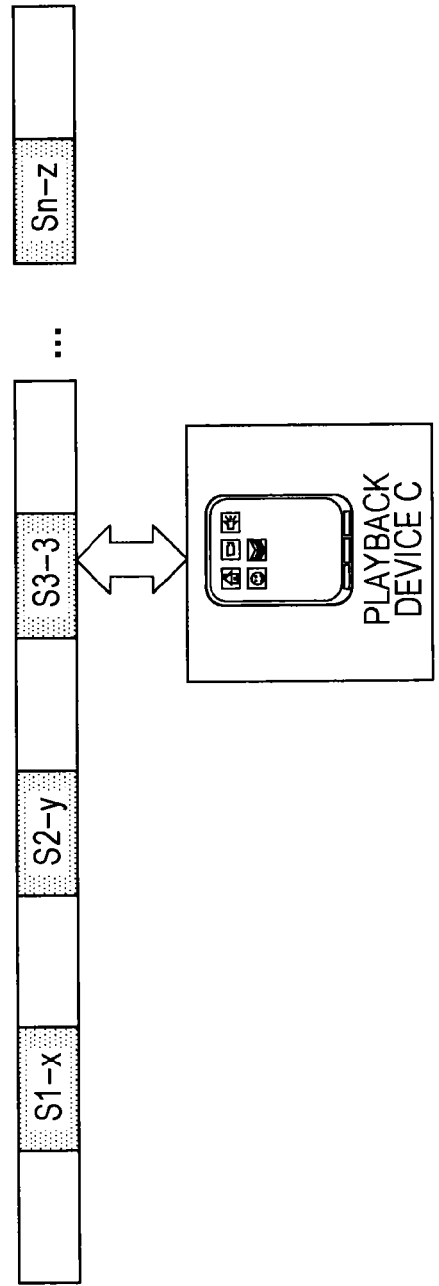

Similarly, the illegally copied content illustrated in FIG. 7B is mixed content that is generated by mixing a plurality of pieces of content decrypted in a plurality of playback devices.

The server 300 analyzes the variation data identifier included in the variation data included in the copy content. As illustrated, the variation data identifier (S3-3) is extracted from the variation data S3-3.

The variation data S3-3 is variation data included in the playback path notified to the playback device c, and the server 300 can determine that at least one of the sources of the copy content is the playback device C.

In this manner, even if the illegally distributed content is mixed data of a plurality of pieces of data which are decrypted and played by a plurality of playback devices, it is possible to identify definitely the source of the content constituting the mixed content based on one piece of variation data included therein.

Further, according to the sequence illustrated in FIG. 4, a path is notified according to a request from the playback device, and there is an advantage in that the types of configurable paths and the number of available playlist are not limited.

For example, there is a limit in that the number of playlist files configurable in one piece of content which is recorded on a BD-ROM is at maximum 256, as a limit based on the format standard of the BD-ROM.

However, in a configuration of providing a playlist file for playing the playback path, along with the playback path notification to the playback device 200 by the server 300 which is performed according to the sequence illustrated in FIG. 4, it is not necessary to store the playlist file in the information recording medium. Accordingly, many different playlists are available over the limit of the maximum number of the playlist files=256, based on the standard of the BD-ROM, and it is possible to provide each playback device with different playlists of several hundred to several thousand or more.

For example, as described with reference to FIGS. 1A and 1B, when the number of segment regions is 15 and the number types of the variation data configured in each segment region is 16, $16^{15}$ different playback paths can be configured in principle.

However, in the configuration of recording a playlist on the information recording medium (BD-ROM), the number of playlist that can be recorded on the BD-ROM is up to 256, such that the type of the playback path that can be configured is limited to maximum 256 in practice.

In contrast, according to the sequence described with reference to FIG. 4, according to a configuration in which the server provides the playback device with the playlist, it does not receive a limit of the BD-ROM standard, therefore it is possible to use a playlist according to the number of playback paths which is available in principle, for example, $16^{15}$ different playback paths.

According to the configuration, it is possible to configure different playback paths and playlists, not in units of types of playback device, but for each playback device.

According to such a configuration, when an illegal copy is distributed, based on the variation data included in the illegally copied content, it is possible to trace the source of the illegally copied content, not only in units of types of playback device, but also for each playback device.

Further, during the process, when the server notifies each playback device of the playback path and provides each playback device the playlist, the server performs management by generating, for example, the following corresponding data as management data.

(a) Identification information specific to a playback device, (b) Playback path information (including information of variation data in each segment region to be played), (c) Playlist file identification information, When illegally distributed copy data is found, the server identifies the playback device which has notified the playback path including the variation data, based on the variation data included in the illegally distributed copy data.

In the example described with reference to FIGS. 6A and 6B, the number of variation data which is configured in each segment region of the content stored in the information recording medium is set to 3, but the number of the variation data may be arbitrary number.

Figure 8:
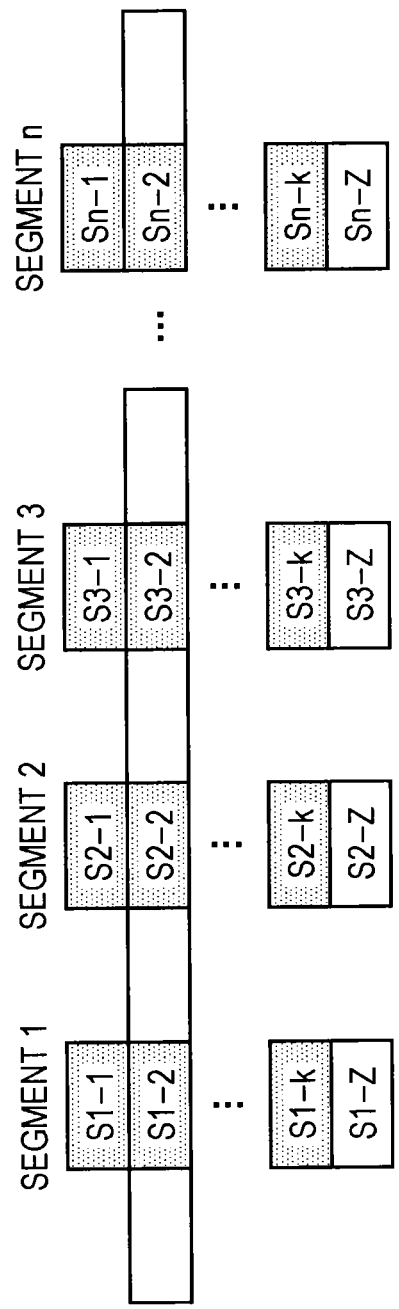
FIG. 8 is a diagram describing a playback path configuration example for the playback device according to the process of an embodiment of the present disclosure.

For example, as illustrated in FIG. 8, it may be configured in such a manner that the number of pieces of variation data configured in each segment region is set to k+1, and the number of segments which are selectable according to the playback path notified to the playback device having a low reliability is k.

Further, as described above, it is configured in such a manner that the server provides the playlist file, such that there is no limit in the number of playlist files, and the number of variation data which is configured in each segment region can be configured to an arbitrary number of 16 or more described with reference to FIGS. 1A and 1B.

The variation data identifier is embedded in each variation data of each segment region illustrated in FIG. 8, and it is possible to detect a variation data identifier from the playback data, for example, the playback image data.

Figure 9:
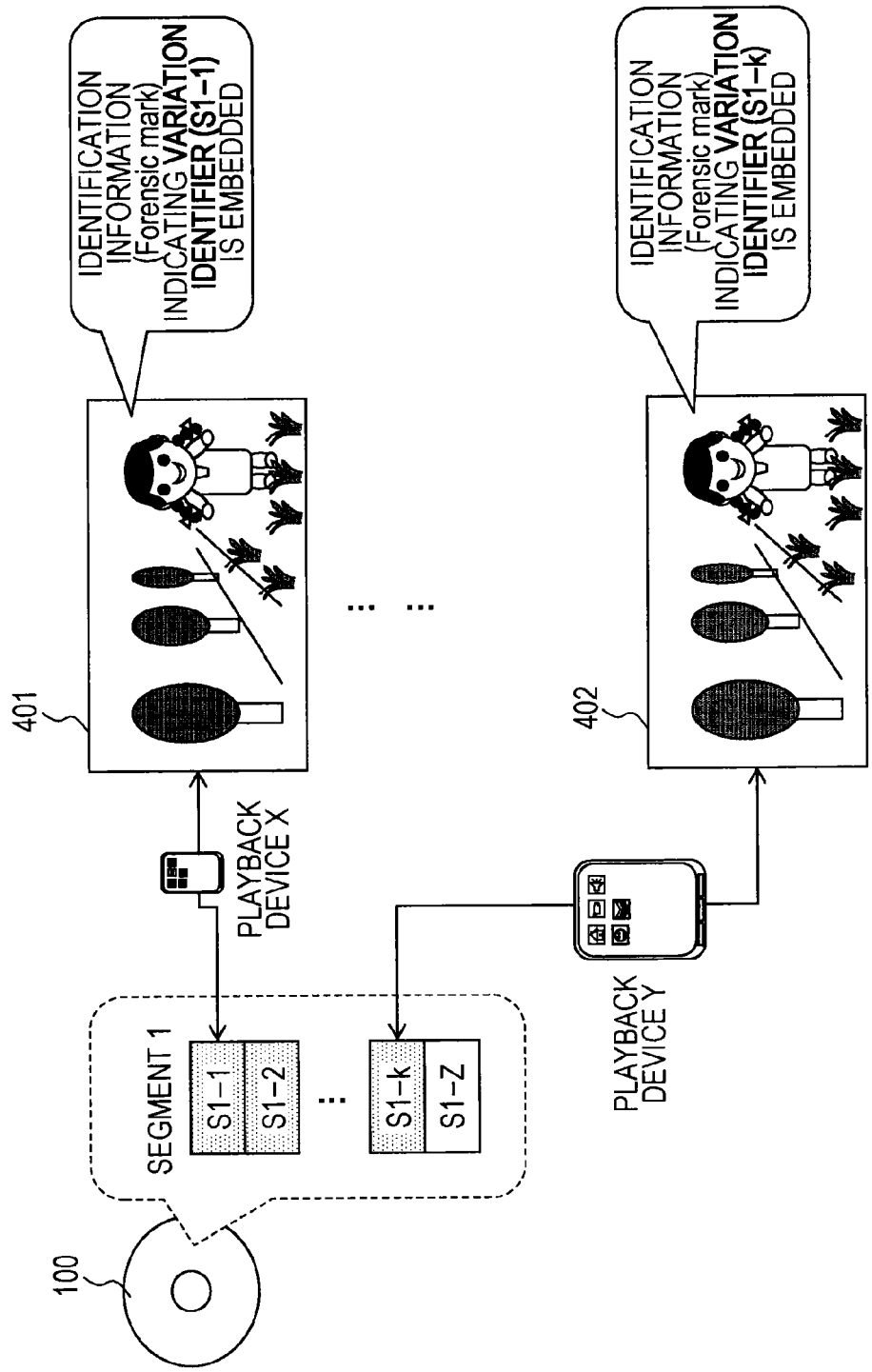
FIG. 9 is a diagram describing decrypted content generated by the playback device for which a playback path is specified according to a process of an embodiment of the present disclosure.

A specific example will be described with reference to FIG. 9. As illustrated in FIG. 9, for example, a plurality of pieces of variation data are set in one segment region [segment 1] constituting the content stored in the information recording medium 100.

It is assumed that the playback path X notified to the playback device X is the playback path on which the variation data [S1-1] of the segment 1 is selectively played.

From an image 401 which is decrypted by the playback device X, it is possible to detect a variation data identifier (Forensic mark) indicating that the image is the variation data [S1-1] of the segment 1.

It is assumed that the playback path Y notified to the playback device Y is the playback path on which the variation data [Sk-1] of the segment 1 is selectively played.

From an image 402 which is decrypted by the playback device Y, it is possible to detect a variation data identifier (Forensic mark) indicating that the image is the variation data [Sk-1] of the segment 1.

[4. Source Tracing Process of Illegally Distributed Content]

Next, a description will be given of a source tracing process of illegally distributed content which is performed by, for example, a content management device such as the server, with reference to FIG. 10 and the subsequent drawings.

FIG. 10 is a diagram illustrating an example of management data which is generated by the server when the server notifies the playback device of the playback path, according to the sequence described with reference to FIG. 4.

As described above with reference to FIG. 4, the server notifies the playback path of the content including the segment region stored in the information recording medium included in the playback device, according to the request from the playback device, and provides the playback device with a segment key applied to the decrypting of the variation data belonging to the notified playback path and a playlist file applied to the playback process of the playback path.

When the server provides the playback device with the data, the server generates, for example, management data illustrated in FIG. 10 and stores the generated management data in the storage unit in the server.

The management data illustrated in FIG. 10 is data corresponding to the following (1) to (5).

(1) playback device identifier
(2) reliability
(3) notified playback path identifier
(4) variation data included in notified playback path
(5) playlist identifier applied to the execution of playback according to the notified playback path When illegally copied decrypted content is found, for example, on a network or a pirate disc and the like, the server analyzes the source of the found illegally copied content by using the management data.

The processing sequence of the source analysis process will be described with reference to FIG. 11.

Figure 11:
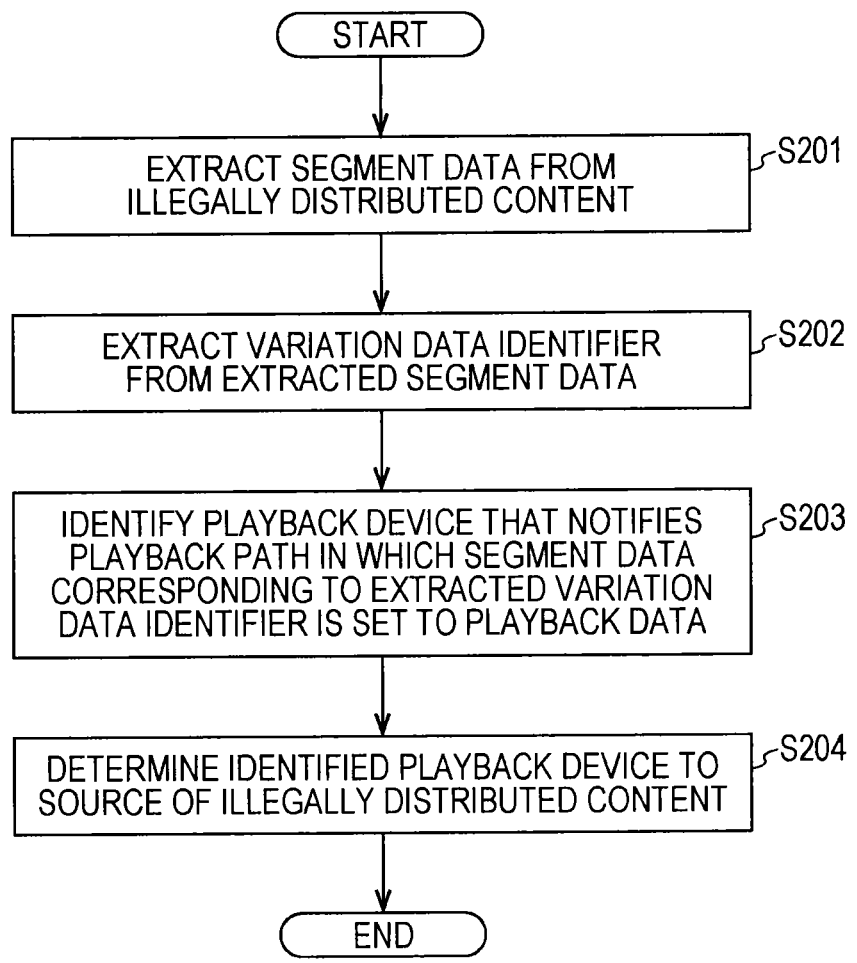
FIG. 11 is a diagram illustrating a flowchart describing a source tracing process sequence of illegally distributed content executed by the server.

Further, the process according to the flow illustrated in FIG. 11 is performed, for example, according to the program stored in the storage unit of the server, in the data processing unit of the server including the CPU and the like having a program execution function.

The processes of the respective steps will be sequentially described.

(S201)

The server extracts variation data from the illegally distributed content in step S201.

(Step S202)

Next, the server extracts a variation data identifier from the extracted variation data, in step S202.

As described in the above with reference to FIG. 9 and the like, the variation data identifier for determining a type of variation data is embedded in each variation data. For example, the variation data identifier is embedded as water mark data, and the embedded data is extracted.

(Step S203)

Next, the server identifies a playback device that has notified playback path in which variation data corresponding to the extracted variation data identifier is set as playback data in step S203.

The server performs the above process referring to the management data described above with reference to FIG. 10.

The playback path notified to each playback device and variation data which is the playback data included in the playback path are recorded on associated with each other on the management data.

The server identifies the playback device that has notified the playback path including the variation data having the variation data identifier extracted in step S202, based on the associated data.

(Step S204)

Next, the server determines the playback path identified in step S203 to the source of the illegally distributed content, in step S204.

In this manner, in the process of the present disclosure, it is possible to reliably analyze the source of the illegally distributed content, from the variation data constituting the illegally distributed content.

Further, when the variation data different from the variation data corresponding to one playback path is detected from the illegally distributed content, the source determination process according to the flow illustrated in FIG. 11 is performed for each variation data.

Through this process, even if mixed content of decrypted content of a plurality of playback devices is distributed, it is possible to reliably identify a plurality of playback devices which has generated a plurality of pieces of source decrypted content which have been used for generating the mixed content.

Further, an example of identifying a playback data based on the variation data identifier (Forensic Mark) embedded in the variation data has been described in the embodiment described above, but the example is based on the configuration of the management data illustrated in FIG. 10.

In other words, the example is based on the identifier of each playback device and the management data associated with the variation data included in each playback path.

Accordingly, if data other than the playback device identifier, for example, a user ID or a disc identifier is registered as data which is managed in association with the variation data included in each playback path, it is possible to identify the user who manages the playback device of the content which is the source of the illegal copy, and a disc recording the source content, based on the variation data identifier detected from the illegally copied content.

FIG. 12 illustrates an example of data that can be registered in the management data, as the data associated with the variation data identifier.

The data managed in association with the variation data identifier includes, for example, the following respective types of data as illustrated in FIG. 12.

(1) playback device manufacturer identifier
(2) playback device model identifier
(3) playback device specific identifier
(4) playback program identifier
(5) user ID
(6) disc serial number (information recording medium identifier)

For example, it is possible to register the data in association with the variation data identifier as the management data.

(4) playback program identifier includes the identifier, the version number, and the like of a playback application or firmware, which play content.

(5) user ID is the ID of the user who owns a playback device. (6) disc serial number is the identifier of an information recording medium that stores content.

As described above, in the configuration of the present disclosure, the upper limit of the number of the variation data which is configured in each segment region is not set.

The numbers of (3), (5), and (6) are significantly large number, but it is possible to configure, for example, a plurality of types of different variation data corresponding to each identifier of (3), (5), (6), in one segment region of the content.

Further, for example, if (5) user ID is managed in association with the variation data identifier, when the playback path notification process according to the sequence illustrated in FIG. 4 is performed, the server makes a request for user information to the playback device. The server registers the user information (user ID) received from the playback data and the variation data included in the playback path in association with each other, as management data.

When the illegally distributed content is found by the above process later, the management device (server) searches the management data, based on the variation data identifier extracted from the variation data constituting the illegally distributed content.

The management device (server) can determine the user having the user ID registered with an entry including the variation data corresponding to the extracted variation data identifier as the source of the illegally distributed content.

The other data is also the same, and when management data including information of variation data included in the playback path notified to the playback device is generated as the management data, the data processing unit of the server generates, for example, management data associated with at least one identifier of the playback device identifier, the user identifier, or the information recording medium identifier, for the playback path information, as illustrated in FIG. 12.

When the data processing unit of the server performs the source tracing of illegally distributed content, the data processing unit first extracts the variation data identifier from the variation data included in the illegally distributed content. Further, the data processing unit performs the source tracing process of illegally distributed content based on the playback device identifier, the user identifier, or the information recording medium identifier which is registered in the management data, as a notification source including the variation data corresponding to the extracted variation data identifier.

Further, the server may also be configured to determine the configuration of a playback path to be notified to each playback device, according to a region or a country in which the playback device is located.

For example, the playback path is configured as illustrated in FIG. 13.

As illustrated in FIG. 13, as described below, the server allocates a playback path according to the region or the country in which the playback device is located, and provides a playlist file according to the playback path.

(1) Japan: playback paths 000 to 055, and playlist files 000 to 055
(2) North America: playback paths 100 to 145, and playlist files 100 to 145
(3) South America: playback paths 200 to 222, and playlist files 200 to 222
(4) Europe: playback paths 300 to 321, and playlist files 300 to 321
(5) China: playback paths 400 to 444, and playlist files 400 to 444
(6) Southeast Asia: playback paths 500 to 521, and playlist files 500 to 521

The server notifies the playback path according to the region or the like in which the playback device is located, for example, according to the configuration, and provides the playlist file according to the playback path.

Further, it may be set that the region information of the playback device may be received from the playback device during the execution of the sequence described above with reference to FIG. 4, or it may be configured in such a manner that the server analyzes the IP address which is set to the playback device and identifies a region in which the playback device is located, during the communication with the playback device.

The server manages and stores region information of the playback device in association with the management data (FIG. 10) generated in association with the playback path information notified to each playback device.

It is possible to identify a region in which illegal copy is performed, based on, for example, the variation data extracted from the illegally distributed content, by configuring the position of the playback device in the management data in this manner.

[5. Hardware Configuration Example of Information Processing Device]

Figure 14:
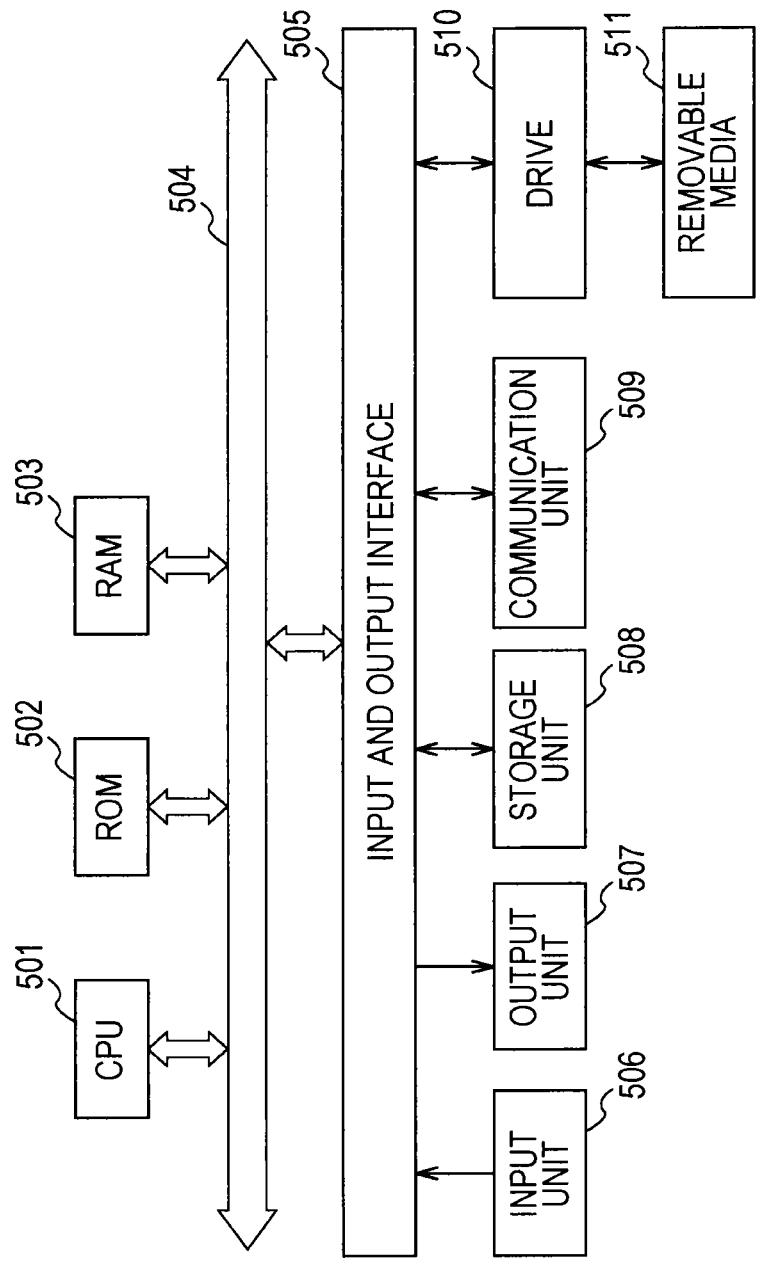
FIG. 14 is a diagram describing a hardware configuration example of the information processing device.

Next, a description will be given of the hardware configuration examples of an information processing device applicable as the playback device, the server, and the management device described in the above embodiment, with reference to FIG. 14.

A central processing unit (CPU) 501 functions as a data processing unit that executes various processes according to a program which is stored in a read only memory (ROM) 502 or a storage unit 508. For example, the CPU 501 executes a process according to the sequence described in the above example. The program and the data executed by the CPU 501 are stored in a random access memory (RAM) 503. The CPU 501, ROM 502 and RAM 503 are connected to each other through a bus 504.

The CPU 501 is connected to an input and output interface 505 through the bus 504, and an input unit 506 including various switches, a keyboard, a mouse, a microphone, and the like, and an output unit 507 including a display and a speaker are connected to the input and output interface 505.

The CPU 501 executes various processes in response to a command which is input from the input unit 506, and outputs a processing result to, for example, the output unit 507.

The storage unit 508 connected to the input and output interface 505 includes, for example, a hard disc and the like, and stores the programs and various pieces of data which are executed by the CPU 501. The communication unit 509 functions as a transmitting and receiving unit of data communication through a network such as the Internet or a local area network, and a transmitting and receiving unit of broadcast waves, and communicates with external devices.

Drives 510 connected to the input and output interface 505 drives a removable media 511 such as a magnetic disc, an optical disc, a magneto-optical disc, and a semiconductor memory such as a memory card, and executes recording or reading of data.

Further, decrypting or encoding of data may be the process of the CPU 501 which is the data processing unit, but it may be configured to include a codec as dedicated hardware for executing an encoding process or a decrypting process.

[6. Summary of the Configuration of the Present Disclosure]

Hitherto, the embodiments of the present disclosure have been described in detail with reference to a specific embodiment. However, it is obvious that those skilled in the art can make modifications and substitutions of the embodiments without departing from the scope of the disclosure. In other words, the disclosure has been disclosed in the form of examples, and should not be construed as limiting. In order to determine the scope of the present disclosure, the appended claims should be considered.

Further, the technology disclosed in the specification may be configured in the following manner.

(1) An information processing device including: a data processing unit that performs a content playback process; and a communication unit that communicates with a server, wherein the content is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit receives playback path information which is allowed to be played from the server through the communication unit, and selects variation data from the segment region so as to perform content playback, according to the playback path information received from the server.

(2) The information processing device according to (1), wherein the content is content stored in an information recording medium, and wherein the communication unit transmits a content identifier of the content, or an identifier of the information recording medium to the server, and receives playback path information that is permitted in response to the content, from the server.

(3) The information processing device according to (1) or (2), wherein the data processing unit acquires a segment key from a segment key file received from the server, and decrypts the variation data by applying the acquired segment key.

(4) The information processing device according to any one of (1) to (3), wherein the data processing unit acquires an encrypted segment key from a segment key file received from the server, and decrypts the variation data by applying the segment key that is acquired by performing a decryption process of the acquired encrypted segment key.

(5) The information processing device according to any one of (1) to (4), wherein the communication unit receives a playlist which is a playback control information file for performing a playback process according to the playback path information received from the server, from the server, and wherein the data processing unit performs content playback according to the playback path information by applying the playlist received from the server.

(6) An information processing device including: a communication unit that communicates with a playback device that performs content playback; and a data processing unit that performs a generation process or an acquisition process of transmission data for the playback device, wherein content played by the playback device is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit notifies the playback device of playback path information which is allowed to be played, through the communication unit, and generates management data in which the notified playback path information and identification information of the playback device which is a notification destination are associated with each other.

(7) The information processing device according to (6), wherein the management data includes information of variation data included in the playback path notified to the playback device.

(8) The information processing device according to (6) or (7), wherein the data processing unit changes the playback path notified to the playback device, depending on a type of the playback device.

(9) The information processing device according to any one of (6) to (8), wherein the data processing unit changes the playback path notified to the playback device, depending on reliability of the playback device.

(10) The information processing device according to any one of (6) to (9), wherein the data processing unit notifies a playback device that is determined to have low reliability of playback path information including specific variation data which is selected in advance.

(11) The information processing device according to any one of (6) to (10), wherein the data processing unit changes a playback path notified to the playback device, depending on a location in which the playback device is located.

(12) The information processing device according to any one of (6) to (11), wherein the data processing unit extracts a variation data identifier from variation data included in illegally distributed content, and performs a source tracing process of determining a playback device which has notified a playback path including variation data corresponding to the extracted variation data identifier to a source of illegally distributed content, based on the management data.

(13) The information processing device according to any one of (6) to (12), wherein the data processing unit generates management data including information of variation data included in the playback path notified to the playback device, as management data, and generates management data in which at least one identifier of a playback device identifier, a user identifier, and an information recording medium identifier is associated with the playback path information.

(14) The information processing device according to (13), wherein the data processing unit extracts a variation data identifier from variation data included in illegally distributed content, and performs a source tracing process of illegally distributed content based on a playback device identifier, a user identifier, or an information recording medium identifier which is registered in management data as a notification destination of a playback path including variation data corresponding to the extracted variation data identifier.

(15) An information processing method performed by an information processing device, wherein the information processing device includes a data processing unit that performs a content playback process; and a communication unit that communicates with a server, wherein the content is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit receives playback path information which is allowed to be played from the server through the communication unit, and selects variation data from the segment region so as to perform content playback, according to the playback path information received from the server.

(16) An information processing method performed by an information processing device, wherein the information processing device includes a communication unit that communicates with a playback device that performs content playback; and a data processing unit that performs a generation process or an acquisition process of transmission data for the playback device, wherein content played by the playback device is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the data processing unit notifies the playback device of playback path information which is allowed to be played, through the communication unit, and generates management data in which the notified playback path information and identification information of the playback device which is a notification destination are associated with each other.

(17) A program for causing an information processing device to perform information process, wherein the information processing device includes a data processing unit that performs a content playback process; and a communication unit that communicates with a server, wherein the content is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the program causes the data processing unit to perform a process of receiving playback path information which is allowed to be played from the server through the communication unit, and a process of selecting variation data from the segment region so as to perform content playback, according to the playback path information received from the server.

(18) A program for causing an information processing device to perform information process, wherein the information processing device includes a communication unit that communicates with a playback device that performs content playback; and a data processing unit that performs a generation process or an acquisition process of transmission data for the playback device, wherein content played by the playback device is content that has a segment region configured with a plurality of pieces of variation data which can be respectively decrypted by different keys, and for which a plurality of playback paths can be configured according to variation data which is selected as a playback object, wherein each piece of variation data is data for which a variation data identifier can be analyzed from decrypted data, and wherein the program causes the data processing unit to perform a process of notifying the playback device of playback path information which is allowed to be played, through the communication unit, and a process of generating management data in which the notified playback path information and identification information of the playback device which is a notification destination are associated with each other.

The series of processes described in the specification may be performed by both or either of hardware and software. In the case of executing a process by software, a program recording the processing sequence may be executed by being installed in a memory within a computer built into dedicated hardware, or may be executed by being installed in a general-purpose computer capable of executing various processes. For example, the program may be pre-recorded on a recording medium. The program may be received through a network such as local area network (LAN) or the Internet, and installed in a recording medium such as a built-in hard disc, as well as being installed in the computer from the recording medium.

The various processes described in the specification may be executed in parallel or individually according to processing ability of the device executing the process or as necessary, as well as in time series according to the description. Further, the system in the specification is a logical set of a plurality of devices, and is not necessary that the devices of respective configurations are within the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   circuitry configured to
      perform a content playback process, and
      communicate with a server,
   wherein the content is content that has a segment region configured with a plurality of pieces of variation data which is respectively decryptable by different keys, and for which a plurality of playback paths is configurable according to variation data which is selected as a playback object,
   wherein each piece of variation data is data for which a variation data identifier is analyzable from decrypted data, and
   wherein the circuitry is configured to
      receive playback path information which is allowed to be played from the server, the circuitry receiving the playback path information from the server in accordance with a determination performed at the server of a type of the information processing device, an information processing device of a first type receiving different playback path information than an information processing device of a second type, and
select variation data from the segment region so as to perform content playback, according to the playback path information received from the server, the server being configured to extract a variation data identifier from variation data included in illegally distributed content, and perform a source tracing process of determining a playback device which has notified a playback path including variation data corresponding to the extracted variation data identifier to a source of illegally distributed content, based on management data.

2. The information processing device according to claim 1,
wherein the content is content stored in an information recording medium, and
wherein the circuitry is configured to
transmit a content identifier of the content, or an identifier of the information recording medium to the server, and
receive playback path information that is permitted in response to the content, from the server.

3. The information processing device according to claim 1,
wherein the circuitry is configured to
acquire a segment key from a segment key file received from the server, and decrypt the variation data by applying the acquired segment key.

4. The information processing device according to claim 1,
wherein the circuitry is configured to
acquire an encrypted segment key from a segment key file received from the server, and decrypt the variation data by applying the segment key that is acquired by performing a decryption process of the acquired encrypted segment key.

5. The information processing device according to claim 1,
wherein the circuitry is configured to
receive, from the server, a playlist which is a playback control information file for performing a playback process according to the playback path information received from the server, and
perform content playback according to the playback path information by applying the playlist received from the server.

6. An information processing device comprising:
circuitry configured to
communicate with a playback device that performs content playback, and
perform a generation process or an acquisition process of transmission data for the playback device,
wherein content played by the playback device is content that has a segment region configured with a plurality of pieces of variation data which is respectively decryptable by different keys, and for which a plurality of playback paths is configurable according to variation data which is selected as a playback object,
wherein each piece of variation data is data for which a variation data identifier is analyzable from decrypted data, and
wherein the circuitry is configured to
notify the playback device of playback path information which is allowed to be played,
generate management data in which the notified playback path information and identification information of the playback device which is a notification destination are associated with each other,
extract a variation data identifier from variation data included in illegally distributed content, and
perform a source tracing process of determining a playback device which has notified a playback path including variation data corresponding to the extracted variation data identifier to a source of illegally distributed content, based on the management data.

7. The information processing device according to claim 6,
wherein the management data includes information of variation data included in the playback path notified to the playback device.

8. The information processing device according to claim 6,
wherein the circuitry is configured to
change the playback path notified to the playback device, depending on a type of the playback device.

9. The information processing device according to claim 6,
wherein the circuitry is configured to
change the playback path notified to the playback device, depending on reliability of the playback device.

10. The information processing device according to claim 6,
wherein the circuitry is configured to
notify a playback device that is determined to have low reliability of playback path information including specific variation data which is selected in advance.

11. The information processing device according to claim 6,
wherein the circuitry is configured to
change a playback path notified to the playback device, depending on a location in which the playback device is located.

12. The information processing device according to claim 6,
wherein the circuitry is configured to
generate management data including information of variation data included in the playback path notified to the playback device, as management data, and
generate management data in which at least one identifier of a playback device identifier, a user identifier, and an information recording medium identifier is associated with the playback path information.

13. The information processing device according to claim 12,
wherein the circuitry is configured to
perform the source tracing process of illegally distributed content based on a playback device identifier, a user identifier, or an information recording medium identifier which is registered in management data as a notification destination of the playback path including variation data corresponding to the extracted variation data identifier.

14. An information processing method performed by an information processing device, the information processing method comprising:
performing a content playback process;
communicating with a server,
wherein the content is content that has a segment region configured with a plurality of pieces of variation data which is respectively decryptable by different keys, and for which a plurality of playback paths is configurable according to variation data which is selected as a playback object, and wherein each piece of variation data is data for which a variation data identifier is analyzable from decrypted data;

receiving playback path information which is allowed to be played from the server, the receiving receives the playback path information from the server in accordance with a determination performed at the server of a type of the information processing device, an information processing device of a first type receiving different playback path information than an information processing device of a second type; and selecting variation data from the segment region so as to perform content playback, according to the playback path information received from the server, the server being configured to extract a variation data identifier from variation data included in illegally distributed content, and perform a source tracing process of determining a playback device which has notified a playback path including variation data corresponding to the extracted variation data identifier to a source of illegally distributed content, based on management data.

15. An information processing method performed by an information processing device, the information processing method comprising:

communicating with a playback device that performs content playback;

performing a generation process or an acquisition process of transmission data for the playback device, wherein content played by the playback device is content that has a segment region configured with a plurality of pieces of variation data which is respectively decryptable by different keys, and for which a plurality of playback paths is configurable according to variation data which is selected as a playback object, and wherein each piece of variation data is data for which a variation data identifier is analyzable from decrypted data;

notifying the playback device of playback path information which is allowed to be played;

generating management data in which the notified playback path information and identification information of the playback device which is a notification destination are associated with each other;

extracting a variation data identifier from variation data included in illegally distributed content; and performing a source tracing process of determining a playback device which has notified a playback path including variation data corresponding to the extracted variation data identifier to a source of illegally distributed content, based on the management data.

16. A non-transitory computer-readable storage medium including computer executable instructions, wherein the instructions, when executed by an information processing device, cause the information processing device to perform a method, the method comprising:

performing a content playback process;
communicating with a server, wherein the content is content that has a segment region configured with a plurality of pieces of variation data which is respectively decryptable by different keys, and for which a plurality of playback paths is configurable according to variation data which is selected as a playback object, and wherein each piece of variation data is data for which a variation data identifier is analyzable from decrypted data;

receiving playback path information which is allowed to be played from the server, the receiving receives the playback path information from the server in accordance with a determination performed at the server of a type of the information processing device, an information processing device of a first type receiving different playback path information than an information processing device of a second type; and selecting variation data from the segment region so as to perform content playback, according to the playback path information received from the server, the server being configured to extract a variation data identifier from variation data included in illegally distributed content, and perform a source tracing process of determining a playback device which has notified a playback path including variation data corresponding to the extracted variation data identifier to a source of illegally distributed content, based on management data.

17. A non-transitory computer-readable storage medium including computer executable instructions, wherein the instructions, when executed by an information processing device, cause the information processing device to perform a method, the method comprising:

communicating with a playback device that performs content playback;

performing a generation process or an acquisition process of transmission data for the playback device, wherein content played by the playback device is content that has a segment region configured with a plurality of pieces of variation data which is respectively decryptable by different keys, and for which a plurality of playback paths is configurable according to variation data which is selected as a playback object, and wherein each piece of variation data is data for which a variation data identifier is analyzable from decrypted data;

notifying the playback device of playback path information which is allowed to be played;

generating management data in which the notified playback path information and identification information of the playback device which is a notification destination are associated with each other;

extracting a variation data identifier from variation data included in illegally distributed content; and performing a source tracing process of determining a playback device which has notified a playback path including variation data corresponding to the extracted variation data identifier to a source of illegally distributed content, based on the management data.

* * * * *